May 8, 1945. E. R. ROBERTSON 2,375,325
SELF-LOCKING NUT
Filed Jan. 13, 1943 4 Sheets-Sheet 1

Edward R. Robertson
By
Watson, Cole, Grindle & Watson
attys.

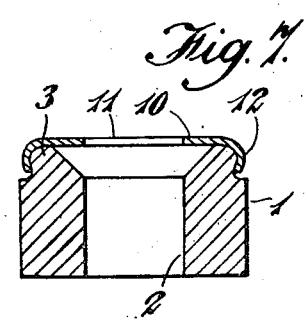
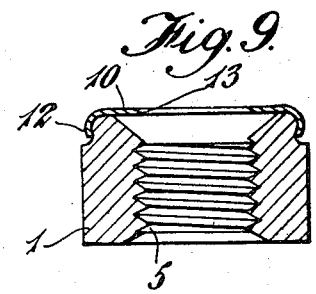
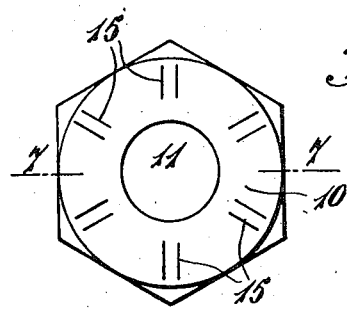
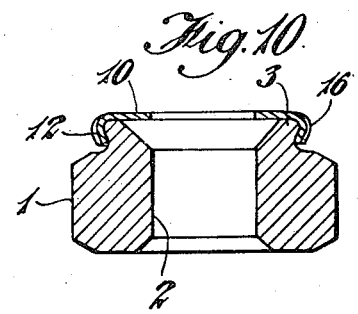
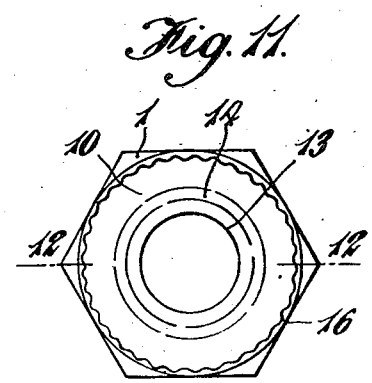
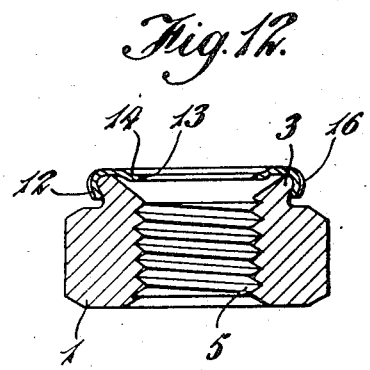

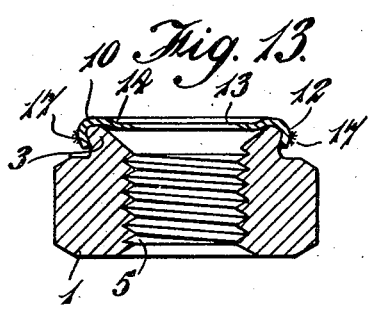
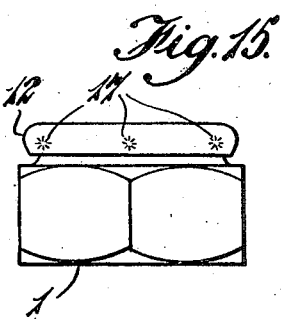
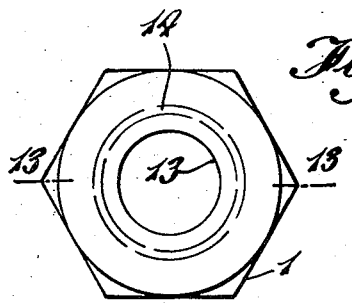
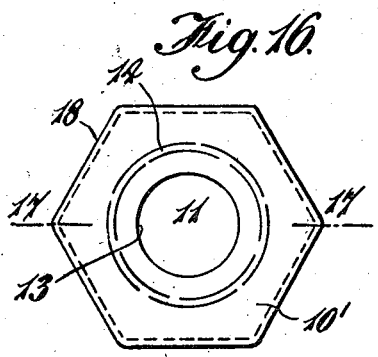
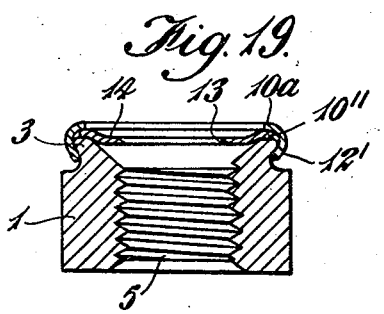
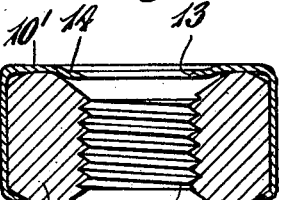
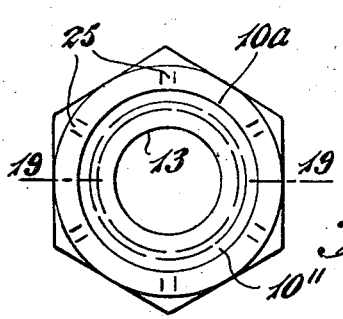

May 8, 1945.     E. R. ROBERTSON     2,375,325
SELF-LOCKING NUT
Filed Jan. 13, 1943     4 Sheets-Sheet 4
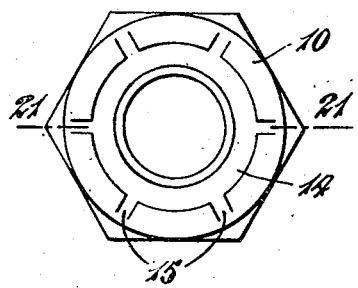
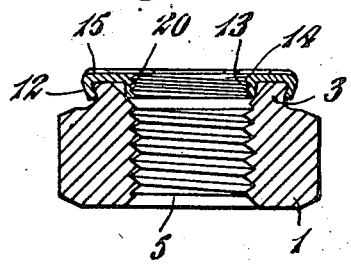
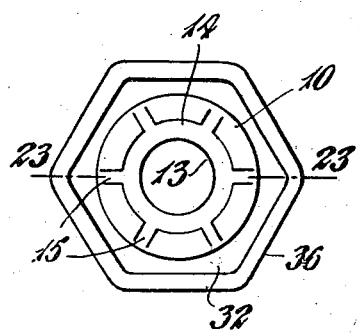
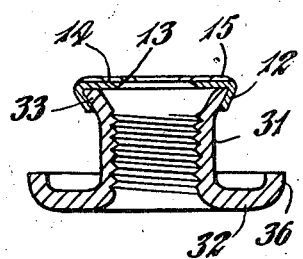
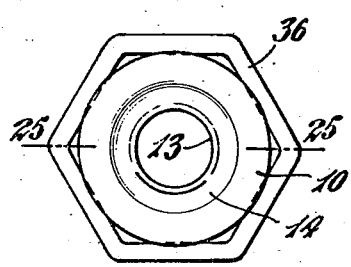
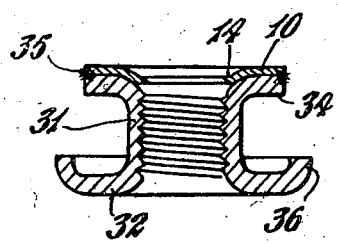

UNITED STATES PATENT OFFICE 2,375,325

SELF-LOCKING NUT

Edward Roker Robertson, St. Margarets-on-Thames, Twickenham, England, assignor to Oliver Edwin Simmonds, Ripley, Surrey, England Application January 13, 1943, Serial No. 472,244
In Great Britain February 13, 1942

13 Claims. (Cl. 10—86)

This invention relates to self-locking nuts and similar internally screw-threaded members (hereinafter referred to as a nut) of the kind comprising a body portion having a screw-threaded bore, and a locking member formed separately from the body portion and secured to the non-working end of the body portion of the nut against relative rotary and axial bodily movement, the said locking member having a flexible diaphragm portion and a thread which corresponds to but is out of pitch with the thread of the body portion, so that, when the nut is screwed on to a bolt, the bolt thread displaces the thread of the locking member to bring the thread into pitch with the thread of the body portion of the nut and the resultant flexing of the diaphragm portion causes the locking member to exert on the bolt an axial force which urges the load carrying sides of the threads of the nut and bolt tightly together. Such a self-locking nut is hereinafter referred to as a self-locking nut of the kind specified.

In self-locking nuts of the kind specified which have been proposed previously, the diaphragm portion of the locking member has been housed wholly within the body portion of the nut so that the diaphragm portion of the locking member, in use of the nut, is flexed about points which lie relatively near to the axis of the nut.

In the improved self-locking nut in accordance with the present invention, the locking member is directly or indirectly secured to the body portion of the nut so that at least the outer part of the flexible diaphragm portion of the locking member extends externally of the body portion of the nut. In this manner, the diaphragm portion of the locking member, in use of the nut, can be made to flex about points which lie relatively remote from the nut axis, preferably about a circle of relatively large radius. It is usually preferred that the locking member be secured to the body portion of the nut by means depending from the outer periphery of the flexible diaphragm portion of the locking member.

In accordance with an important feature of the present invention, the flexible diaphragm portion of the locking member is formed with stiffening ribs, and these ribs are preferably indented into the body portion of the nut.

The invention also includes a method of making a self-locking nut of the kind specified, which comprises securing a locking member having a flexible diaphragm portion to the body portion of a nut so that at least the outer part of the diaphragm portion of the locking member extends externally of the body portion of the nut, providing in a single operation the said body portion and the locking member with helically aligned threads, and bringing the thread of the locking member out of pitch with the thread of the said body portion.

It is desirable that the maximum cross-sectional dimension of the locking member shall not exceed the minimum cross-sectional dimension of the body portion of the nut so that application of a wrench to the nut is not hindered. The present improved method of mounting the locking member enables this condition to be complied with whilst at the same time ensuring that the locking member has a resiliency sufficient to provide an effective and durable locking action.

In carrying the invention into practice, it is preferred to provide the body portion of the nut at its non-working end with a tubular extension or neck and to form the locking member with a flange, skirt or other means which depends from the periphery of the diaphragm portion thereof and which is secured to the outside of the said tubular extension to hold the locking member at the end of the said body portion against relative rotary and axial bodily movement. The body portion of the nut and the locking member are provided with helically aligned threads, as by passing a tap therethrough, and the thread of the locking member is then brought out of pitch with the thread of the body portion of the nut. The de-pitching of the locking member may be effected by dishing the part thereof adjacent the threaded opening therein.

The flange, skirt or other securing means on the locking member may be secured to the tubular extension or neck of the body portion of the nut in any suitable manner. For example, the said flange or the like may be welded to the tubular extension or it may be crimped or indented into interlocking engagement with the said tubular extension. According to another method of securing the locking member, the flange or skirt of the locking member, which flange or skirt may be of cylindrical contour, is pressed into the undercut recess provided by a diverging tubular extension of the body portion of the nut. It is preferred, however, to provide the locking member with a converging flange and to upset the tubular extension or neck of the body portion of the nut into interlocking engagement with the said flange to secure the locking member to the said body portion.

The body portion of the nut may be formed without a tubular extension. In this case the locking member may, for example, be welded to the non-working end of the body portion of the nut, or it may be formed with depending peripheral means which is of tubular or other desired shape and which forms a housing or casing for the whole or a part of the body portion of the nut.

The diaphragm portion of the locking member and the threaded central portion thereof may comprise a centrally holed disc of uniform thickness and it will be understood that in this case the diaphragm portion is not clearly distinguished from the threaded central portion. The disc may have a thickness greater than the pitch of the thread to be formed in the body portion of the nut, whereby the disc is provided with a fully formed thread which may comprise one or more convolutions. Usually, however, it is preferred that the disc should have a thickness substantially less than the pitch of the thread formed in the body portion of the nut so that the disc, after the assembly is threaded, is provided with a partly formed thread. Alternatively the central portion of the locking member may comprise an annular flange or tube which depends from the diaphragm portion. Such a locking member may be formed by drawing metal from a flat blank to form the annular flange or tube which may be of such length that the thread formed therein comprises a plurality of convolutions. In either form of the locking member the flexible diaphragm portion may be tapered or otherwise formed with a part of reduced thickness to increase the resiliency of the locking member.

The invention will be further described with reference to the accompanying drawings, in which like reference numerals denote like parts, and in which:

Figures 1 to 6 inclusive illustrate various steps in the manufacture of the present preferred form of self-locking nut, Figure 1 being a perspective view, partly in section, of the body portion of the nut, Figure 2 a perspective view of the locking member, Figure 3 a perspective view, partly in section, showing the locking member assembled on the body portion, Figure 4 a similar view showing the tubular extension on the body portion upset into interlocking engagement with the flange on the locking member, Figure 5 a similar view showing the assembly of Figure 4 after it has been threaded, and Figure 6 being a similar view showing the locking member de-pitched;

Figures 7 to 9 illustrate a modified method of making the self-locking nut shown in Figure 6, Figure 7 being a vertical section taken on the line 7—7 of Figure 8, Figure 8 a top plan view of the nut before the threading and de-pitching operations, and Figure 9 a view similar to that of Figure 7 showing the assembly threaded and the locking member de-pitched;

Figures 10 to 12 illustrate a modified method of securing the locking member to the body portion of the nut, Figure 10 being a central vertical sectional view showing the assembly prior to the threading operation, Figure 11 a top plan view of the assembly after the threading and de-pitching operations, and Figure 12 a vertical section taken on the line 12—12 of Figure 11;

Figures 13 to 15 show a nut in accordance with the invention, illustrating a further method of securing the locking member, Figure 13 being a vertical section taken on the line 13—13 of Figure 14, Figure 14 a top plan view of the nut assembly after the de-pitching operation, and Figure 15 a side elevational view of the nut shown in Figures 13 and 14;

Figure 1:
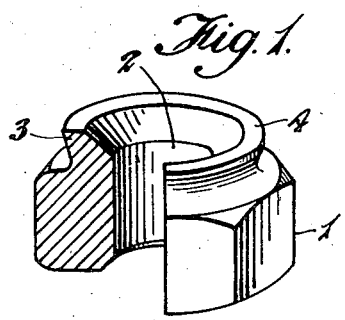

Figures 16 to 21 inclusive illustrate three further forms of self-locking nut in accordance with the invention, Figures 16, 18 and 20 being top plan views and Figures 17, 19 and 21 being vertical sections taken on the lines 17—17, 19—19, and 21—21 of Figures 16, 18 and 20 respectively;

Figures 22 and 23 illustrate one form of sheet metal nut in accordance with the invention, Figure 22 being a top plan view, and Figure 23 a vertical section taken on the line 23—23 of Figure 22, and Figures 24 and 25 show a further form of sheet metal nut, Figure 24 being a top plan view, and Figure 25 a vertical section taken on the line 25—25 of Figure 24.

Referring first to Figures 1 to 6, the body portion 1 of the nut, having a bore 2 therethrough, is formed from bar stock of hexagonal contour as shown, or of any other desired external contour, and is turned down to form at its non-working end a diverging tubular extension or neck 3 having inner and outer side faces of frusto-conical form and an outer end face 4 lying in a plane extending normal to the nut axis. The tubular extension or neck 3 is so formed that the maximum diameter of the end face 4 of the extension 3 is less than the distance between opposed flats of the body portion of the nut.

Figure 2:
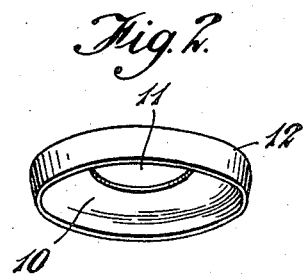
Figure 3:
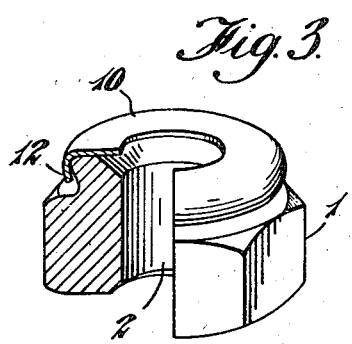
Figure 4:
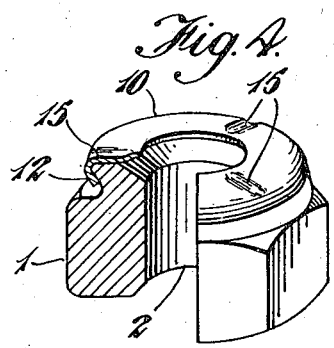

The locking member shown in Figure 2 is in the form of a disc 10 comprising a circular section of resilient material which has a concentric circular or substantially circular aperture 11 of a diameter that is preferably substantially equal to the diameter of the bore 2 of the body portion 1 and which also has a depending converging peripheral flange 12 of frusto-conical form. The disc 10 has a uniform thickness substantially less than the pitch of the thread to be formed in the body portion 1 and the minimum internal diameter of the flange is such that it can be placed or sprung around the tubular extension 3 of the body portion to seat the disc on the end face 4 of the extension, as shown in Figure 3. With the disc 10 so assembled with the body portion of the nut, axial pressure is applied to the disc to upset the tubular extension 3 of the said body portion into interlocking engagement with the flange 12 on the disc whereby the disc is secured to the said body portion with the aperture 11 in the disc and the bore 2 of the body portion in axial alignment, as shown in Figure 4.

Figure 5:
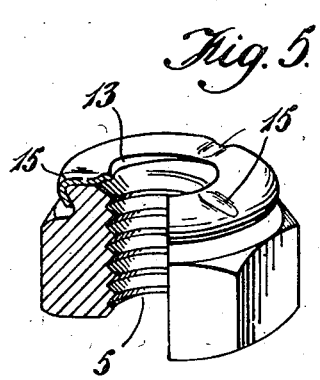

With the disc 10 thus secured to the body portion 1 of the nut, the bore 2 of the said body portion and the aperture 11 in the disc are provided with threads which are helically aligned, as by passing a tap through the assembly from the working end of the nut. The assembly, after the threading operation, is shown in Figure 5, and it will be observed that, due to the thinness of the disc, it is provided with only a partly formed thread 13.

Figure 6:
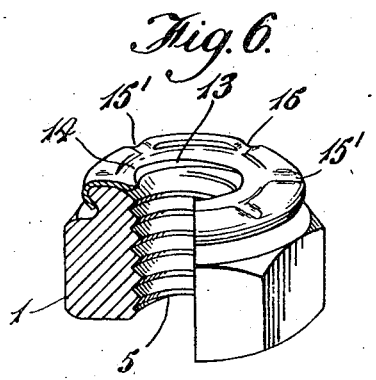

In the next operation, the thread 13 formed in the disc is brought out of pitch with the thread 5 formed in the bore 2 by dishing the central portion of the disc, as shown at 14, Figure 6.

The outer portion of the disc is preferably formed with a plurality of radially extending ribs which serve to stiffen the disc. Such ribs are preferably symmetrically arranged and are advantageously formed, at least in part, during the upsetting operation so that the disc is indented into the end face of the tubular extension of the body portion of the nut. The ribs thus provided not only serve to stiffen the disc but also key the disc to the body portion of the nut against relative rotary movement. The disc may be independently keyed to the body portion of the nut, if desired. In the method of manufacture shown in Figures 1 to 6, three symmetrically arranged radially extending ribs 15 are formed during the upsetting operation, as shown in Figure 4, whilst a further three intermediately disposed similar ribs 15' are formed during the dishing operation, as shown in Figure 6, by means of a punch which not only acts against the central portion of the disc to dish the disc, but also acts against the outer part of the disc which is held against the end face 4 of the tubular extension 3 of the body portion of the nut. The punch may, if desired, act to upset further the tubular extension 3 so that de-pitching of the disc is effected partly by the dishing thereof and partly by the further upsetting of the tubular extension 3 whereby the locking member is moved bodily slightly nearer to the base of the nut.

The locking member shown in Figure 2 may be made by suitable piercing, blanking and forming operations from sheet material which preferably comprises spring steel, for example, stainless steel, or phosphor bronze, although other ferrous or non-ferrous metal or other material having the desired degree of elasticity may be employed. The body portion of the nut may be made of any desired material, e. g. steel, or aluminium or magnesium metal or alloy.

The amount by which the thread of the disc is displaced axially during the dishing operation may be relatively large without causing the disc at any point to be stressed near to or beyond its elastic limit when the nut is threaded on a bolt, since, due to the present improved method of mounting the locking member whereby the disc is flexed about a circle of relatively large radius, the angle through which the disc is moved is relatively small.

In an alternative method of making the self-locking nut shown in Figure 6, de-pitching of the locking member is effected solely by a further upsetting of the tubular extension of the body portion of the nut. Such alternative method is illustrated in Figures 7 to 9. In securing the locking member to the body portion of the nut, the tubular extension 3 of the said body portion 1 is upset into engagement with the flange 12 of the disc 10, as shown in Figure 7. The body portion 1 and disc 10 are thereafter threaded and the tubular extension 3 is then further upset whereby the locking member is moved bodily towards the base of the nut to bring the thread 13 of the disc 10 out of pitch with the thread 5 of the body portion 1 to the desired amount, as shown in Figure 9. It will be seen from Figure 8 that, during the preliminary upsetting operation, six radially extending symmetrically arranged ribs 15 are formed on the disc, instead of three as illustrated in Figure 4. If desired, the disc 10 before assembly with the body portion 1 of the nut, may be dished.

Figures 10 to 12 illustrate another method of securing the locking member to the body portion of the nut. According to the method shown in these figures, the locking member is secured to the body portion of the nut by crimping or indenting the flange 12 of the locking member into interlocking engagement with the tubular extension 3 of the body portion, as shown at 16 (Figure 10). Thereafter the assembly is tapped and the thread 13 in the locking member is then brought out of pitch with the thread 5 of the body portion by dishing the disc, as shown in Figures 11 and 12.

In the method of securing the locking member to the body portion of the nut illustrated in Figures 13 to 15, the flange 12 on the disc 10 is spot-welded to the tubular extension or neck 3 of the body portion of the nut, as indicated at 17. After the welding operation, the assembly is tapped and the disc 10 is dished to de-pitch the locking member.

In the self-locking nut shown in Figures 16 and 17, the disc 10' of the locking member is of hexagonal outline and, instead of being formed with a converging flange, is formed with a depending peripheral tube 18 of hexagonal contour so as to form a housing or casing for the body portion 21 of the nut which is also of hexagonal contour and a close fit within the tube 18. The locking member may be secured to the body portion 21 by bending the end 19 of the tubular housing 18 into engagement with the bevelled corners of the base of the body portion 21, as shown. Alternatively, the said tubular housing or casing 18 may be welded to the body portion 21. In a modification, not shown, the disc is formed with a depending peripheral tube which, in length, is less than the height of the body portion of the nut so that part only of the body portion of the nut is housed within the tube. In this modification the upper part of the body portion is preferably exteriorly recessed to receive the tube so that it does not extend laterally beyond the flats on the lower part of the body portion of the nut. For example, the upper part of the body portion may be turned down to provide a recess to receive a depending cylindrical tube.

It is not necessary that the means adapted to co-operate with the body portion of the nut in the securing of the disc to the said body portion should be integral with the disc and such means may be separate from the disc. For example, the disc may be formed without a depending peripheral flange and be secured to a tubular extension of the body portion by means of an annular washer having a depending peripheral converging flange of generally conical form, the disc being placed in position on the tubular extension of the body portion and secured thereto by placing the flange of the washer round the said tubular extension and applying pressure to upset the said tubular extension into firm engagement with the flange on the washer. A self-locking nut having the disc secured in this manner is shown in Figures 18 and 19. In this form of nut, the disc 10", which is flat before assembly with the body portion 1, is secured against the end face 4 of the tubular extension 3 by the annular washer 10a having a converging flange 12'. In the nut shown in these figures, six symmetrically arranged radially extending ribs are formed on the inner face of the disc 10" by indenting the washer 10a as shown at 25, Figure 18.

In all the various forms of self-locking nut described above with reference to Figures 1 to 19 of the drawings, the central portion of the locking member may comprise an annular flange or tube which depends from the diaphragm portion, and which is internally threaded when the assembly is tapped. In the nut shown in Figures 20 and 21, the disc 10 has a depending annular flange or tube 20, which may be formed by drawing metal from a flat blank. In other respects the nut shown in Figures 20 and 21 is similar to that shown in Figure 6 and may be produced in the manner described with reference to the nut shown in said figure.

The body portion of the nut, instead of being made from bar stock, may be formed from sheet metal. In the case of a sheet metal nut, the non-working end of the tubular shank or body portion of the nut may be flared outwardly to form a diverging extension, the locking member having means which depend from the periphery of the diaphragm portion thereof and which are secured to the outside of said diverging extension. Alternatively, the non-working end of the body portion of the nut may be formed with one or more laterally-extending parts forming a seat for the locking member which is secured in position on the seat in any suitable manner. For example, the body portion of the nut may be formed with an annular flange to which the locking member is spot welded, or it may be formed with a plurality of laterally-extending lugs to which the locking member is secured by bent-over end portions of such lugs. If desired, a plurality of axially-aligned locking members may be secured to the body portion of the nut.

In the sheet metal nut shown in Figures 22 and 23, the tubular shank or body portion 31 has a base 32 and an outwardly flared portion 33 at its non-working end which is upset into engagement with the flange 12 on the disc 10 to secure the locking member to the body portion 31. In the manufacture of the nut shown in these figures, the disc 10 and body portion 31, after being secured together as aforesaid, are provided with helically aligned threads, and the locking member is then de-pitched by dishing the disc as shown at 14.

In the sheet metal nut shown in Figures 24 and 25, the non-working end of the body portion 31 of the nut has a laterally-extending annular flange 34 to which the disc 10 is spot welded as shown at 35.

The base of the nut may take a wide variety of different forms. For example, the base may extend at right angles to the axis of the nut, and be of square or other suitable shape to provide an anchor nut, or it may be of hexagonal or other polygonal shape and have upwardly or downwardly extending flanges providing gripping surfaces for a wrench. In the nuts shown in Figures 22 to 25, the base 32 is of hexangonal shape and has upwardly extending flanges 36.

I claim:

1. A self-locking nut comprising a body portion having a screw-threaded bore and a tubular extension at its non-working end, and a locking member formed separately from the body portion and secured to the body portion against relative rotary and axial bodily movement, the said locking member having a thread which corresponds to but is out of pitch with the thread of the body portion, and also having a flexible diaphragm portion, which has means depending from the periphery thereof and secured to the outside of the tubular extension of the body portion.

2. A self-locking nut as claimed in claim 1, wherein the said means depending from the diaphragm portion is crimped into engagement with the said tubular extension.

3. A self-locking nut as claimed in claim 1, wherein the said tubular extension is upset into interlocking engagement with the said means depending from the diaphragm portion.

4. A self-locking nut comprising a body portion having a screw-threaded bore, and a locking member formed separately from the body portion and secured to the body portion against relative rotary and axial bodily movement, the said locking member having a thread which corresponds to but is out of pitch with the thread of the body portion, and also having a flexible diaphragm portion, which is provided with stiffening ribs and the outer part of which extends externally of the said body portion.

5. A self-locking nut comprising a body portion having a screw-threaded bore and a tubular extension at its non-working end, and a locking member formed separately from the body portion and secured to the body portion against relative rotary and axial bodily movement, the said locking member having a thread which corresponds to but is out of pitch with the thread of the body portion, and also having a flexible diaphragm portion, which has means depending from the periphery thereof and secured to the outside of the tubular extension of the body portion and which also has stiffening ribs indented into the said tubular extension.

6. A self-locking nut comprising a hexagonal body portion having a screw-threaded bore and at one end thereof a diverging tubular extension having inner and outer side faces of frusto-conical form, a locking member having a central threaded portion and an annular outer flexible diaphragm portion, and a conical flange depending from the periphery of the diaphragm portion and surrounding and firmly secured to the said tubular extension of the body portion whereby the locking member is secured to the body portion in axial alignment with part of the diaphragm portion seated on the end of the tubular extension, the thread of the locking member corresponding to the thread of the body portion but being out of pitch therewith, and the maximum diameter of the locking member not being greater than the distance between opposed flats of the body portion.

7. A self-locking nut comprising a hexagonal body portion having a screw-threaded bore and at one end thereof a diverging tubular extension having inner and outer side faces of frusto-conical form, a locking member having a central threaded portion and an annular outer flexible diaphragm portion, and a conical flange depending from the periphery of the diaphragm portion and surrounding and firmly secured to the said tubular extension of the body portion whereby the locking member is secured to the body portion in axial alignment with part of the diaphragm portion seated on the end of the tubular extension, the thread of the locking member corresponding to the thread of the body portion but being out of pitch therewith, the diaphragm portion having stiffening ribs indented into the end of the tubular extension, and the maximum diameter of the locking member not being greater than the distance between opposed flats of the body portion.

8. A self-locking nut comprising a body portion having a screw-threaded bore and at its non-working end a diverging tubular extension, and an annular locking member having a depending conical flange surrounding the said tubular extension and secured thereto against relative movement, the said locking member having a thread corresponding to but out of pitch with the thread of the body portion and comprising a flexible diaphragm portion which has a thickness less than the pitch of the thread of the body portion and which has a plurality of substantially symmetrically arranged radially extending stiffening ribs indented into the end of the said tubular extension.

9. A self-locking sheet metal nut comprising a threaded tubular body portion having a base and an outwardly flared portion at its non-working end, and an annular locking member having a depending conical flange surrounding the said flared portion and secured thereto against relative movement, the said locking member having a thread corresponding to but out of pitch with the thread of the body portion and also having a flexible diaphragm portion.

10. The method of making a self-locking nut which comprises securing a locking member having a flexible diaphragm portion to the body portion of a nut so that at least the outer part of the diaphragm portion extends externally of the body portion by upsetting part of the body portion into engagement with co-operating means depending from the periphery of the diaphragm portion, forming helically aligned threads within the body portion and locking member in a single operation, and bringing the thread of the locking member out of pitch with the thread of the body portion by further upsetting the said part of the body portion to effect bodily displacement of the threaded portion of the locking member with respect to the nut.

11. The method according to claim 10, wherein a plurality of stiffening ribs are formed on the diaphragm portion of the locking member by indenting the diaphragm portion of the locking member into the body portion during an upsetting operation.

12. The method of making a self-locking nut which comprises providing a locking member having a flexible diaphragm portion and means depending from the periphery of the diaphragm portion, providing a body portion of a nut having a tubular extension as its non-working end, securing the depending means of the locking member to the outside of the said tubular extension with part of the diaphragm portion seated on the end of said tubular extension, forming helically aligned threads within the body portion and the locking member, bringing the threads of the locking member out of pitch with the thread of the body portion, and forming a plurality of stiffening ribs on the diaphragm portion of the locking member by indenting said diaphragm portion into the end of the tubular extension.

13. The method of making a self-locking nut which comprises providing a body portion of a nut with a diverging tubular extension at one end thereof, providing a locking member having a flexible diaphragm portion and a converging flange depending from the periphery of the diaphragm portion, upsetting the said extension into interlocking engagement with the converging flange to secure the locking member to the said extension, forming helically aligned threads within the body portion of the nut and the locking member, and bringing the thread of the locking member out of pitch with the thread of the said body portion, and forming a plurality of radially extending stiffening ribs on the diaphragm portion of the locking member by indenting said diaphragm portion of the locking member into the end face of the tubular extension.

EDWARD ROKER ROBERTSON.